United States Patent [19]

Kimura et al.

[11] Patent Number: 5,786,088
[45] Date of Patent: Jul. 28, 1998

[54] YELLOWISH SCALY POWDER COMPRISING OF METAL OXIDE COMPOSITE COATING

[75] Inventors: Asa Kimura; Yukie Ikuta, both of Yokohama, Japan

[73] Assignee: Shiseido Co., Ltd., Tokyo, Japan

[21] Appl. No.: 703,679

[22] Filed: Aug. 27, 1996

[30] Foreign Application Priority Data

Aug. 31, 1995 [JP] Japan .................................. 7-248630

[51] Int. Cl.$^6$ ......................................................... B32B 5/16
[52] U.S. Cl. ........................... 428/403; 428/404; 428/701
[58] Field of Search .................................. 428/403, 404, 428/699, 701

[56] References Cited

U.S. PATENT DOCUMENTS

| | | | |
|---|---|---|---|
| 5,026,429 | 6/1991 | Mronga et al. | 106/400 |
| 5,116,664 | 5/1992 | Kimura et al. | 428/216 |
| 5,118,352 | 6/1992 | Noguchi | 106/436 |
| 5,352,649 | 10/1994 | Shibahashi et al. | 503/207 |

OTHER PUBLICATIONS

Abstract JP 07 157 689 A, Dainichiseika Color & Chem. Mfg., 1995 Jun. 1920, Japan.
EP 0 401 045 A, Tayca Corp., May 12, 1990, Europe.
Abstract JP 61 295 234 A, Sumitumo Chem., Ind., 26 Dec. 1986, Japan.
Abstract JP 04 065 471 A, Tayca Corp., 2 Mar. 1992, Japan.
Abstract JP 07 157 688 A, Dainichiseika Color & Chem. Mfg., 20 Jun. 1995, Japan.
Abstract JP 04 249 584 A, Tayca Corp., 4 Sep. 1992, Japan.

*Primary Examiner*—H. Thi Le
*Attorney, Agent, or Firm*—Ronald R. Snider

[57] ABSTRACT

A yellowish scaly powder is characterized in that a scaly powder surface is coated with a composite metal oxide of titanium and nickel or a composite metal oxide of titanium, nickel, and a third metal component. The yellowish scaly powder has a favorable yellowish color tone, in which color tone and glossiness can be easily adjusted, and which is excellent in pigment characteristics such as safety, light resistance, acid resistance, base resistance, heat resistance, and dispersion stability.

17 Claims, 1 Drawing Sheet

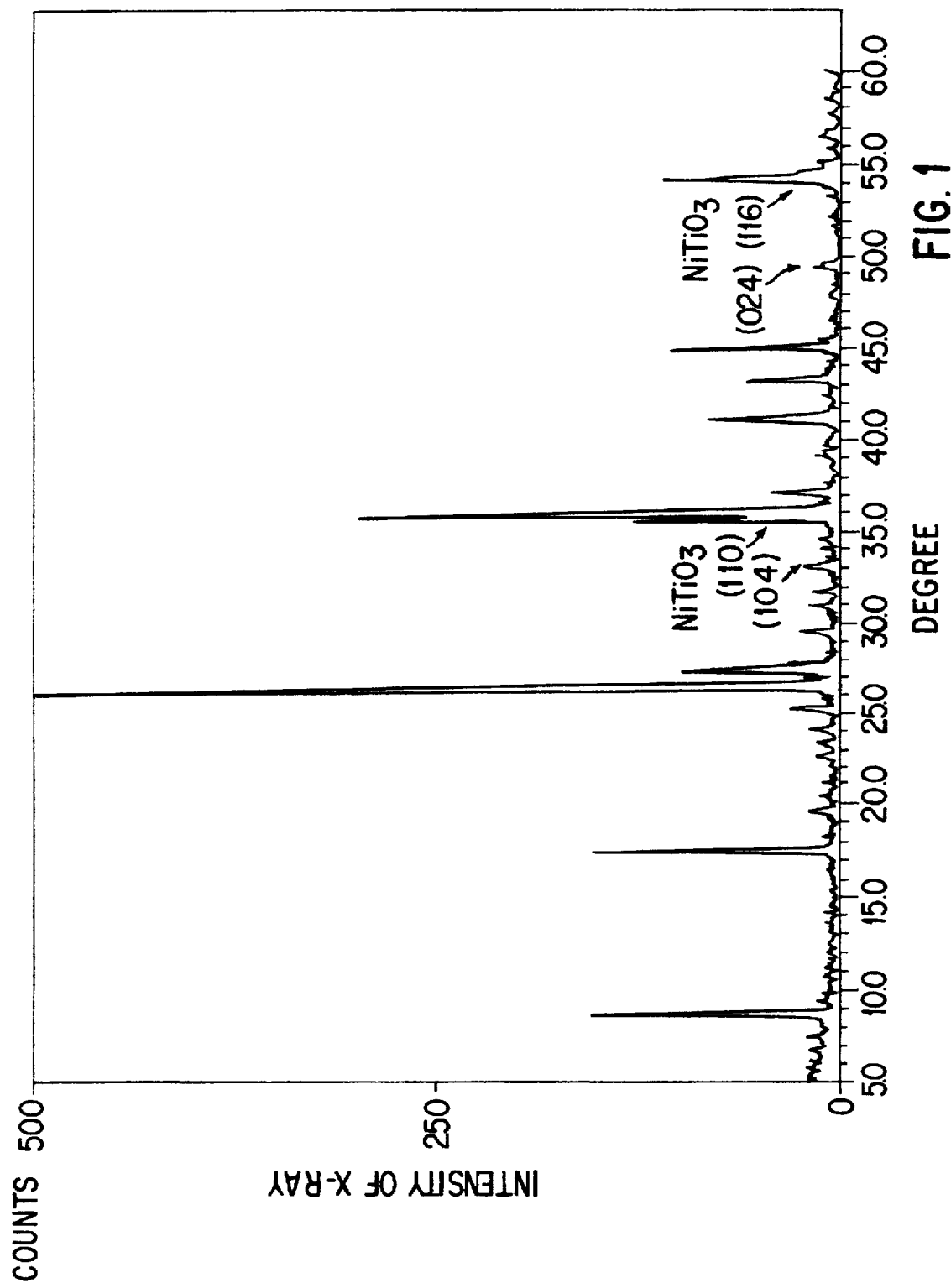

YELLOWISH SCALY POWDER COMPRISING OF METAL OXIDE COMPOSITE COATING

RELATED APPLICATIONS

This application claims the priority of Japanese Patent Application No. 7-248630 filed on Aug. 31, 1995, which is incorporated herein by reference.

FIELD OF THE INVENTION

The present invention relates to a yellowish scaly powder and, in particular, to improvement of color tone, stability, or the like thereof.

BACKGROUND OF THE INVENTION

In wide industrial fields, as yellowish pigments which have conventionally been used, there are titanium mica, in which the surface of mica is coated with titanium dioxide, and powders in which a scaly powder such as mica, talc, kaolin, aluminum foil, or titanium mica is admixed or coated with an inorganic or organic coloring pigment such as iron oxide, Hansa yellow, permanent yellow, or benzidine yellow.

Among them, titanium mica pigments having a yellow interference color (such as Iriodin, commercially-available from German Merck Corporation), in which the surface of mica is coated with titanium dioxide, is favorable in terms of stability and safety. Since its appearance color is basically white, however, a yellowish appearance color cannot be exhibited.

Therefore, in order to obtain a yellowish appearance color, scaly powders admixed or coated with yellowish coloring pigments have been used. Pigment characteristics of these yellowish scaly powders such as safety and light resistance, weather resistance, acid resistance, base resistance, solvent resistance, and heat resistance, however, are largely attributable to the property of coloring pigments added to or coated on the scaly powders. No conventional yellowish scaly powders are sufficiently satisfactory in terms of these characteristics. For example, there have been various shortcomings in cases where organic coloring pigments are added. For example, a yellow titanium mica pigment admixed with Hansa yellow is discolored into red in an acidic solution, and a yellow titanium mica pigment admixed with benzidine yellow generates discoloration upon heat or color separation in a solvent. Also, these organic pigments have been unfavorable in terms of safety.

On the other hand, when titanium mica or the like is coated with an inorganic coloring pigment such as iron oxide, though it is excellent in safety, light resistance, or the like, it has been problematic in acid resistance. Also, due to a high refractive index of iron oxide, the gloss of powders coated with iron oxide is so strong that their coloring is gold rather than yellow. Further, since glossiness cannot be adjusted easily, they have not been applicable to the uses where strong gloss is unfavorable, whereby their range of use has been limited.

In view of such problems of the prior art, the object of the present invention is to provide a yellowish scaly powder having a favorable yellowish appearance color, in which glossiness call be easily adjusted, and which is excellent in pigment characteristics such as safety, light resistance, acid resistance, base resistance, heat resistance, and dispersion stability.

SUMMARY OF THE INVENTION

As a result of diligent studies conducted by the inventors in order to attain the above-mentioned object, it has been found that, when the surface of a scaly powder is coated with a composite metal oxide of titanium and nickel, there can be obtained a yellowish scaly powder having high value of color and high chroma, in which the glossiness can be easily adjusted, and which is excellent in various pigment characteristics. Also, as a result of further studies, it has been found that, when a scaly powder is coated with a composite metal oxide of titanium, nickel, and another (third) metal component, a yellowish scaly powder having various yellowish color tones such as red-tinged yellow and green-tinged yellow can be easily obtained. Thus, the present invention has been accomplished.

Namely, a yellowish scaly powder in accordance with the present invention is characterized in that a scaly powder surface is coated with a composite metal oxide of titanium and nickel.

In said yellowish scaly powder, ratios of titanium and nickel constituting the composite metal oxide coating the scaly powder are preferably such that, with respect to a total metal amount in said composite metal oxide, titanium is 45 to 90% by weight and nickel is 10 to 55% by weight.

Also, in the yellowish scaly powder of the present invention, metal species constituting said composite metal oxide preferably comprise a third metal component in addition to titanium and nickel.

Preferably, said third metal component is at least one metal component selected from the group consisting of Zn, Rb, K, Ba, Sc, Sn, Na, Bi, Pb, Mg, Al, Ce, Nd, and Sr.

Ratios of titanium, nickel, and the third metal component constituting the composite metal oxide coating the scaly powder are preferably such that, with respect to a total metal amount in said composite metal oxide, titanium is 45 to 90% by weight, nickel is 9 to 30% by weight, and the third metal component is 1 to 25% by weight.

Also, the yellowish scaly powder of the present invention is characterized in that a diffraction peak of the composite metal oxide which is different from any peaks of individual oxides of the metal species constituting the composite metal oxide is detected in an X-ray diffraction chart of said yellowish scaly powder.

Preferably, in the yellowish scaly powder of the present invention, the base scaly powder is mica coated with titanium dioxide having an interference color, titanium in said mica coated with titanium dioxide and nickel or nickel and a third metal component are combined together to form the composite metal oxide, and said yellowish scaly powder exhibits an interference color which is identical to the interference color of the mica coated with titanium dioxide used as the base scaly powder.

In the following, the configuration of the present invention will be explained in detail.

Examples of the scaly powder used in the present invention includes muscovite, biotite, phlogopite, synthetic mica, kaolin, talc, planar silica, planar alumina, aluminum foil, stainless foil, and mica coated with titanium dioxide, though not being restricted thereto in particular.

While the particle size of the scaly powder is not restricted in particular, it is preferably in the order of 1 to 50 μm when obtained powder is utilized as cosmetic pigment or general industrial material. Also, it is preferably as flat as possible since a beautiful color tone is likely to be exhibited thereby.

In the present invention, the scaly powder is coated with a composite metal oxide. As metal species constituting the composite metal oxide, titanium and nickel are essential. The metal species constituting the composite metal oxide may contain a third metal component in addition to titanium and nickel. Examples of such a third metal component include zinc, rubidium, potassium, barium, scandium, tin, sodium, bismuth, lead, magnesium, aluminum, cerium, neodymium, and strontium. These ingredients can be used separately as well as in combination of two or more. Here, the third metal component of the present invention is not restricted these examples as long as the effects of the present invention are obtained.

As the scaly powder is coated with the composite metal oxide containing titanium and nickel as the metal species, the yellowish scaly powder in accordance with the present invention characteristically exhibits a favorable yellowish appearance color, while being excellent in stability as a pigment. Also, when the third metal component such as that mentioned above forms, together with titanium and nickel, a composite metal oxide which covers the scaly powders various kinds of yellowish color tones tinged with red, green, and the like are easily obtained, while a chroma higher than that obtained without the third metal component being combined is attained.

Further, as the ratio of the metals constituting the composite metal oxide which covers the scaly powder is adjusted, the glossiness of the yellowish scaly powder of the present invention can be easily adjusted. Also, when the scaly powder is coated with the composite metal oxide containing the third metal component as the metal species, the glossiness can be easily adjusted as the kind of the third metal component is changed. For example, when the third metal component is tin or neodymium, the glossiness can be made low; whereas the glossiness, together with chroma, can be increased when barium or cerium is used as the third metal component.

Here, "yellow" in the yellowish scaly powder in accordance with the present invention not only means that it is seen as yellow with the naked eye but also specifies that it is a color within the range of 6.5 Y to 5.0 GY in hue (H) in Munsell color system.

In the yellowish scaly powder of the present invention, it is required that, at least, titanium and nickel form a composite metal oxide as the metal species to cover the scaly powder. When the scaly powder is simply coated with a titanium oxide and a nickel oxide, the effects of the present invention cannot be attained. Namely, in the powders in which a scaly powder surface is coated with a titanium oxide and then the surface of the scaly powder coated with the titanium oxide is further coated with a nickel oxide or in which, by contrast, a scaly powder surface is coated with a nickel oxide and then the surface of the scaly powder coated with the nickel oxide is further coated with a titanium oxide, yellowish coloring cannot be obtained, while their pigment characteristics are inferior to those coated with the composite metal oxide.

Here, in an X-ray diffraction chart of the yellowish scaly powder in accordance with the present invention, the composite metal oxide in the present invention is detected as a diffraction peak different from any peaks of individual oxides of the metal species constituting the composite metal oxide.

In a yellowish scaly powder of the present invention, when the metal species constituting the composite metal oxide coating the base scaly powder are only titanium and nickel, ratios of titanium and nickel are such that, with respect to a total metal amount in said composite metal oxide, titanium is 45 to 90% by weight and nickel is 10 to 55% by weight or preferably titanium is 55 to 85% by weight and nickel is 15 to 45% by weight. When the ratio of titanium is less than 45% by weight, the chroma of the yellow color tone becomes remarkably low, thereby yielding a dim yellow; whereas, when it exceeds 90% by weight, yellow coloring becomes hardly discernible.

In a yellowish scaly powder of the present invention, when the metal species constituting the composite metal oxide coating the base scaly powder are titanium, nickel and the third metal component, ratios of titanium, nickel, and the third metal component are such that with respect to a total metal amount in said composite metal oxide, titanium is 45 to 90% by weight, nickel is 9 to 30% by weight, and the third metal component is 1 to 25% by weight or preferably titanium is 50 to 80% by weight, nickel is 12 to 26% by weight, and the third metal component is 8 to 24% by weight. When the ratio of titanium is less than 45% by weight, the chroma of the yellow color tone becomes remarkably low; whereas, when it exceeds 90% by weight yellow coloring becomes hardly discernible. Also, when the color tone, glossiness, or the like is to be adjusted by means of the third metal component, it is necessary for the third metal component to have a ratio of 1% by weight or higher. When it is compounded in excess of 25% by weight however, performance of adjustment cannot be exhibited in proportion to the compounded amount and there are cases where the color tone or glossiness may be affected thereby.

As the method of manufacturing the yellowish scaly powder in accordance with the present invention, various methods can be adopted without being restricted in particular as long as the effects of the present invention are obtained. An example thereof comprises the steps of coating the scaly powder surface with hydrous titanium oxide or titanium dioxide beforehand by a neutralization method or a hydrolysis method so as to yield a scaly powder coated with hydrous titanium oxide or titanium dioxide; mixing thus obtained coated scaly powder with at least one of oxide, hydrochloride, carbonate, nitrate, hydroxide, ammonium salt, organic acid salt, and the like of nickel; and then calcining thus mixed powder at 500° to 1,000° C. or preferably at 700° to 900° C. in vacuum or in atmosphere, whereby a yellowish scaly powder coated with a composite metal oxide of titanium and nickel can be obtained.

In this method, when a third metal component is to be combined together with titanium and nickel in the composite metal oxide as the metal species, an oxide or salt of the third metal component is mixed with the above-mentioned oxide or salt of nickel, then thus formed mixture is nixed with the scaly powder coated with hydrous titanium oxide or titanium dioxide, and then the resulting mixture is calcined similarly.

Another example of the method comprises the steps of adding an aqueous solution of at least one of inorganic acid salts such as hydrochloride, sulfate, and nitrate and organic acid salts such as acetate, citrate, and oxalate of titanium and nickel and an aqueous solution of at least one base such as caustic soda, caustic potash, sodium carbonate, potassium carbonate, ammonia, and urea to a scaly powder; neutralizing thus formed mixture such that hydrous titanium oxide and hydrous nickel oxide are deposited on the surface of the scaly powder; and then calcining the resulting scaly powder at 500° to 1,000° C. or preferably at 700° to 900° C. in vacuum or in atmosphere, whereby a yellowish scaly powder coated with a composite metal oxide of titanium and nickel can be obtained.

Here, examples of method for combining a third metal component in such a case include a method in which a mixture of an inorganic acid salt or organic acid salt of titanium, nickel, and the third metal component is added to a scaly powder and then the resulting mixture is neutralized and calcined in a similar manner; a method in which the scaly powder coated with hydrous titanium oxide and hydrous nickel oxide obtained as mentioned above is dried at a temperature not higher than 500° C. before calcining, an oxide or salt of the third metal component is mixed therewith, and then the resulting mixture is calcined at 500° to 1,000° C. or preferably at 700° to 900° C. in atmosphere; and a method in which the scaly powder coated with hydrous titanium oxide and hydrous nickel oxide obtained as mentioned above is dried at a temperature not higher than 500° C. before calcining, an inorganic acid salt or organic acid salt of the third metal component is added thereto and neutralized or hydrolyzed therein so that hydrous oxide of the third metal component is further deposited thereon, and then the resulting scaly powder is calcined at 500° to 1,000° C. or preferably at 700° to 900° C. in atmosphere.

Also, another example of the method comprises the steps of coating the scaly powder surface with hydrous titanium oxide or titanium dioxide beforehand by a neutralization method or a hydrolysis method so as to yield a scaly powder coated with hydrous titanium oxide or titanium dioxide; adding an aqueous solution of at least one of inorganic acid salts such as hydrochloride, sulfate, and nitrate and organic acid salts such as acetate, citrate, and oxalate of nickel and an aqueous solution of at least one base such as caustic soda, caustic potash, sodium carbonate, potassium carbonate, ammonia, and urea to the obtained coated scaly powder; neutralizing thus formed mixture such that hydrous nickel oxide is further deposited on the surface of the coated scaly powder; and then calcining the resulting scaly powder at 500° to 1,000° C. or preferably at 700° to 900° C. in vacuum or in atmosphere, whereby a yellowish scaly powder coated with a composite metal oxide of titanium and nickel can be obtained.

Here, examples of method for combining the third metal component in such a case include a method in which a mixture of an inorganic acid salt or organic acid salt of nickel and the third metal component is added to the coated scaly powder and then the resulting mixture is neutralized and calcined in a similar manner; a method in which the scaly powder coated with hydrous titanium oxide which surface is coated with hydrous nickel oxide obtained as mentioned above is dried at a temperature not higher than 500° C. before calcining, an oxide or salt of the third metal component is mixed therewith, and then the resulting mixture is calcined at 500° to 1,000° C. or preferably at 700° to 900° C. in atmosphere; and a method in which the scaly powder coated with hydrous titanium oxide which surface is coated with hydrous nickel oxide obtained as mentioned above is dried at a temperature not higher than 500° C. before calcining, an inorganic acid salt or organic acid salt of the third metal component is added thereto and neutralized or hydrolyzed therein so that hydrous oxide of the third metal component is further deposited thereon, and then the resulting scaly powder is calcined at 500° to 1,000° C. or preferably at 700° to 900° C. in atmosphere.

The yellowish scaly powder in accordance with the present invention can also exhibit a different yellowish color tone as the calcining temperature or calcining atmosphere for manufacturing is selected. The calcining temperature for manufacturing the yellowish scaly powder is 500° to 1,000° C. or preferably 700° to 900° C. Though depending on the calcining temperature, the calcining time ranges from 0.5 to 20 hours. The calcining atmosphere may not only be oxidizing atmosphere such as air but also adopt various conditions such as vacuum, reducing atmosphere like hydrogen gas or ammonia gas, and inert gas atmosphere like nitrogen gas or argon gas.

Here, though titanium and other metals are combined together to form a composite metal oxide in a solid solution state when calcining is effected in order to manufacture the yellowish scaly powder of the present invention, individual oxides of titanium and other metals may be generated in coexistence with the above-mentioned composite metal oxide depending on conditions. The present invention encompasses such a yellowish scaly powder as long as the effects of the present invention are attained.

The composite metal oxide coating the scaly powder of the present invention has a high transparency Accordingly, when a scaly powder having an interference color, such as mica coated with titanium dioxide, is used as a powder for a base material, the interference color of mica coated with titanium dioxide can also be exhibited in the resulting yellowish scaly powder. Namely, regardless of the ratios of individual metals in the composite metal oxide and the kind of the third metal component, a yellowish scaly powder having a yellowish appearance color and a yellow interference color can be obtained when the base scaly powder is mica coated with titanium dioxide having a yellow interference color, whereas a yellowish scaly powder exhibiting a dichroism made of a yellowish appearance color and an interference color other than yellow can be obtained when mica coated with titanium dioxide having an interference color other than yellow is used as the base scaly powder.

For example, even in the case where the final ratios of titanium and nickel are unchanged, a yellowish scaly powder having yellow appearance color and yellow interference color can be obtained when nickel is combined with mica coated with titanium dioxide having a yellow interference color, whereas a yellowish scaly powder having a dichroism made of a red-tinged yellowish green appearance color and a red interference color can be obtained when nickel is combined with mica coated with titanium dioxide having a red interference color. Also, even in the case where the final ratios of titanium, nickel, and rubidium are unchanged, a product in which nickel and rubidium are combined with mica coated with titanium dioxide having a yellow interference color yields a yellowish scaly powder having vivid yellow appearance color and interference color, whereas a product in which nickel and rubidium are combined with mica coated with titanium dioxide having a blue interference color yields a dichroic yellowish scaly powder having a bluish-green-tinged yellow appearance color and a blue interference color.

In the yellowish scaly powder of the present invention, the interference color influences the appearance color thereof. When it has a yellow interference color, yellow of the appearance color appears more vivid due to their synergistic effect; whereas the coloring of yellow in the appearance color appears weaker when there is no interference color or the interference color is a complementary color.

BRIEF DESCRIPTION OF THE DRAWINGS

FIG. 1 is a X-ray diffraction chart of a yellowish scaly powder in accordance with the present invention, in which a scaly powder is coated with the composite metal oxide of titanium and nickel.

EXAMPLES

In the following, the present invention will be explained with reference to examples thereof. Here, the present invention is not restricted to these examples.

Example 1

To 500 g of ion-exchanged water, 50 g of mica was added and uniformly dispersed therein with sufficient stirring. To thus obtained dispersion, 250 ml of 2M aqueous titanyl sulfate solution was added. While being stirred, this mixture was heated and boiled for 3 hours, left for cooling, and then subjected to filtering. The residue was washed with water and then dried at 200° C., whereby 87 g of mica coated with titanium dioxide (referred to as "titanium mica" hereinafter) was obtained.

Then, 50 g of thus obtained titanium mica was added to 200 ml of ion-exchanged water and uniformly dispersed therein with stirring. To thus obtained dispersion, 165 ml of 0.42M aqueous nickel (II) chloride solution was added for 3 hours at 80° C. while pH was maintained at 4 to 5 with 1N aqueous caustic soda solution. After the resulting mixture was subjected to filtering, the residue was washed with water and then dried at 105° C., whereby 53 g of titanium mica coated with hydrous nickel oxide was obtained.

Then, 50 g of thus obtained titanium mica coated with hydrous nickel oxide was calcined in a magnetic crucible for 4 hours at 880° C., whereby 47.2 g of a glossy powder having a green-tinged yellow appearance color and a yellow interference color was obtained.

When the appearance color of thus obtained powder was measured by means of Minolta CM-1000 analyzer, hue (H) and value (V) of color/chroma (C) in Munsell color system were 9.3 Y and 8.8/3.5, respectively.

Also, when the powder obtained by Example 1 was analyzed by X-ray diffraction method (Cu-K α ray, using JRX-12VA-manufactured by Nihon Denshi K.K.), peaks were seen near diffraction angles of 33.0, 35.7, 49.4, and 54.0 in the X-ray diffraction chart in addition to the diffraction peaks of mica and titanium dioxide shown in FIG. 1. They were diffraction peaks respectively corresponding to (104), (110), (024), and (116) of nickel titanium oxide, $NiTiO_3$, which is a composite metal oxide of titanium and nickel. Accordingly, it was found that titanium and nickel formed a composite metal oxide as the metal species and covered a scaly powder. Here, expressions such as (104) mentioned above refer to planes of diffraction of a crystal designated by (xyz) coordinates.

Next, in order to determine the composition of the powder of Example 1, mica was ground into irregular forms in an agate mortar, and then 1, 2, 4, 16, 24, and 48% by weight each of titanium dioxide and separately synthesized nickel titanium oxide were respectively added thereto so as to determine a calibration curve. When this calibration curve was used to determine the composition ratio of the product on the basis of the intensity ratio of peaks in the X-ray diffraction chart in FIG. 1, the powder of Example 1 was found to comprise 50.8% by weight of mica, 24.5% by weight of titanium dioxide, and 20.2% by weight of nickel titanium oxide. Accordingly, the ratios of titanium and nickel in the composite metal oxide (nickel titanium oxide in this case) were such that titanium and nickel were respectively 44.9% by weight and 55.1% by weight with respect to the total metal amount in the composite metal oxide.

Example 2

To 500 g of ion-exchanged water, 50 g of mica was added and uniformly dispersed therein with sufficient stirring. To thus obtained dispersion, 380 ml of 2M aqueous titanyl sulfate solution was added. While being stirred, this mixture was heated and boiled for 3 hours, left for cooling, and then subjected to filtering. The residue was washed with water and then dried at 150° C., whereby 103 g of mica coated with titanium dioxide (titanium mica) was obtained.

Then, 50 g of thus obtained titanium mica was added to 200 ml of ion-exchanged water and uniformly dispersed therein with stirring. To thus obtained dispersion, 165 ml of 0.42M aqueous nickel (II) chloride hexahydrate solution and 23 ml of 0.42M aqueous tin (II) chloride dihydrate solution were added for 3 hours at 80° C. While pH was maintained at 4 to 5 with 1N aqueous caustic soda solution. After the resulting mixture was subjected to filtering, the residue was washed with water and then dried at 105° C., whereby 53 g of titanium mica coated with hydrous nickel oxide and hydrous tin oxide was obtained.

Then, thus obtained titanium mica coated with hydrous nickel oxide and hydrous tin oxide was calcined in a magnetic crucible for 4 hours at 880° C., whereby a pearl-like glossy powder having a green-tinged yellow appearance color, a green interference color and gloss was obtained.

When the appearance color of thus obtained powder was measured by means of Minolta CM-1000 analyzer, hue (H) and value (V) of color/chroma (C) in Munsell color system were 8.4 Y and 8.6/4.5, respectively.

When the powder obtained by Example 2 was analyzed by X-ray diffraction method as in the case of Example 1, a diffraction peak of a composite metal oxide of titanium, nickel, and tin, which was different from any peaks of titanium oxides, nickel oxides, and tin oxides, was seen in the X-ray diffraction chart.

Also, the composition ratio of the powder of Example 2 and the constitutional ratio of each metal species in the composite metal oxide were calculated as follows. Namely, into 500 ml of water, 16 g of commercially-available muscovite was dispersed and then 2M aqueous titanyl sulfate solution was added thereto with each of standards of 100 ml, 50 ml, 25 ml, and 12.5 ml. Thus obtained mixtures were refluxed at 98° C. for 4 hours while being stirred. The resulting powder was washed with water and then subjected to filtering. The residue was dried and then calcined at 900° C. for an hour, whereby a sample for quantitatively measuring titanium dioxide was prepared. The content of titanium dioxide in this sample was determined by fluorescent X-ray spectroscopy.

Then, as this sample was subjected to powder measuring method of X-ray diffraction (Cu-K α ray), from the intensity ratio of diffracted rays between titanium dioxide (101) plane and mica (006) plane, a calibration curve of titanium dioxide in which titanium dioxide amount and intensity ratio of the diffracted ray were respectively taken as vertical axis and horizontal axis was prepared.

Similarly, the powder obtained by Example 2 and titanium mica used as a material were measured by X-ray diffraction method so as to determine the intensity ratio of diffraction rays between titanium dioxide (101) plane and mica (006) plane, and titanium dioxide and mica in these powders were quantitatively measured on the basis of the above-mentioned calibration curve. As the amounts of titanium dioxide and mica determined by the quantitative measurement mentioned above were subtracted from the total weight of the powder, the amount of the composite metal oxide in the powder obtained by Example 2 was determined.

Then, the difference between the titanium dioxide content in titanium mica used as the material and the titanium dioxide content in the powder obtained by Example 2 was defined as the titanium dioxide amount used for constituting the composite metal oxide. Also, the contents of nickel and tin in the powder obtained by Example 2 were quantitatively measured by means of fluorescent X-rays. From these values, the ratio of each metal species in the composite metal oxide in the powder obtained by Example 2 was calculated.

As a result, the composition of the powder of Example 2 was found to comprise 39.77% by weight of mica, 34.58% by weight of titanium dioxide, 25.65% by weight of a composite metal oxide of titanium, nickel, and tin; whereas the ratios of titanium, nickel, and tin with respect to the total metal mount in the composite metal oxide were 47.3% by weight, 40.5% by weight, and 12.2% by weight, respectively.

Example 3

To 500 g of ion-exchanged water, 50 g of titanium mica obtained in Example 1 mentioned above was added and uniformly dispersed therein with sufficient stirring. To thus obtained dispersion, 280 ml of 0.42M aqueous nickel (II) chloride hexahydrate solution was added for 3 hours at 80° C. while pH was maintained at 4 to 5 with 1N aqueous caustic soda solution. After the resulting mixture was subjected to filtering, the residue was washed with water and then dried at 105° C., whereby 54.8 g of titanium mica coated with hydrous nickel oxide was obtained.

Then, thus obtained titanium mica coated with hydrous nickel oxide and 2.75 g of potassium chloride were uniformly mixed by a small blender and the resulting mixture was calcined in a magnetic crucible for 3 hours at 900° C., whereby a glossy powder having a vivid yellow appearance color and a yellow interference color was obtained.

When the appearance color of thus obtained powder was measured by means of Minolta CM-1000 analyzer, hue (H) and value (V) of color/chroma (C) in Munsell color system were 0.2 GY and 8.5/5.0, respectively.

When the powder obtained by Example 3 was analyzed by X-ray diffraction method as in the case of Example 1, a fraction peak of a composite metal oxide of titanium, nickel, and potassium, which was different from any peaks of titanium oxides, nickel oxides, and potassium oxides, was seen in the X-ray diffraction chart.

Also, when the composition ratio of the powder of Example 3 and the constitutional ratio of each metal in the composite metal oxide were calculated in the case of Example 2, the composition ratio was found to comprise 50.6% by weight of mica, 31.6% by weight of titanium dioxide, 17.8% by weight of a composite metal oxide of titanium, nickel, and potassium; whereas the ratios of titanium, nickel, and potassium with respect to the total metal mount in the composite metal oxide were 43.2% by weight, 40.1% by weight, and 16.7% by weight, respectively.

Experiment 1: Stability Test

Various kinds of stability of the yellowish scaly powders in accordance with Examples 1 to 3 were studied with commercially-available titanium mica having a yellow interference color (Iriodin 205, manufactured by German Merck Corporation) and titanium mica colored with Hansa yellow as comparative examples. Test items were light stability, heat stability, dispersion stability, base stability, and acid stability. Their test methods are as follows:

(1) Light Stability Test

Each sample was mixed with talc (manufactured by Asada Mill Co., Ltd.) at a ratio of 3:7, and 2.5 g of the resulting mixture were stuffed into a square medium dish made of aluminum having a thickness of 3 mm and a side of 20 mm, which was then irradiated with a xenon lamp for 30 hours. The color tones before and after the irradiation were measured with a color analyzer (C-2000, manufactured by Hitachi Corporation), whereby color difference (ΔE) between before and after the irradiation was determined from thus measured values.

(2) Heat Stability Test 3 g of each sample was weighed and introduced into a magnetic crucible of 20 ml and heat-treated for 2 hours in atmosphere under each temperature condition of 200° C., 300° C., and 400° C. The color tones before and after the heat treatment were measured with a color analyzer (C-2000, manufactured by Hitachi Corporation), whereby color difference (ΔE) between before and after the heat treatment was determined from thus measured values.

(3) Dispersion Stability Test 1.0 g of each sample was introduced into a test tube of 50 ml having a common stopper and a scale. 50 ml of 0.2% by weight aqueous hexametaphosphoric acid solution was added thereto and the mixture was dispersed for 30 seconds with a polytron. After the resulting dispersion was further being dispersed with ultrasonic wave, the test tube was stood still, and then the state of dispersion was observed with naked eye immediately after it was left still, 5 minutes thereafter, 10 minutes thereafter, 30 minutes thereafter, and an hour thereafter. Evaluation standards are as follows:

Evaluation Standards

+: Favorable dispersibility is exhibited.

±: Slightly precipitation occurs with color separation.

−: Precipitation occurs with color separation.

(4) Base Stability Test 1.5 g of each sample was introduced into a test tube of 30 ml having a common stopper and a scale. 30 ml of 2N aqueous caustic soda solution was added thereto and then the mixture was dispersed. The test tube was stood still and the color tone was observed with naked eye at 24 hours thereafter. Evaluation standards are as follows:

Evaluation Standards

+: Quite stable without change in color tone.

±: Gradual discoloration and change to pale whitish color.

−: Discoloration and change to white.

(5) Acid Stability Test 1.5 g of each sample was introduced into a test tube of 50 ml having a common stopper and a scale. 30 ml of 1N aqueous hydrochloride solution was added thereto and then the mixture was dispersed. The test tube was stood still and the color tone was observed with naked eye at 24 hours thereafter. Evaluation standards are as follows:

Evaluation Standards

+: Quite stable without change in color tone.

±: Gradual discoloration and change to pale whitish color.

−: Discoloration and change toward white.

TABLE 1

| Sample | Light Stability | Heat Stability | | |
|---|---|---|---|---|
| | | 200° C. | 300° C. | 400° C. |
| Example 1 | 0.12 | 0.11 | 0.11 | 0.17 |
| Example 2 | 0.20 | 0.16 | 0.14 | 0.16 |
| Example 3 | 0.16 | 0.13 | 0.13 | 0.13 |
| Iriodin 205 | 0.15 | 0.15 | 0.16 | 0.17 |
| Titanium mica colored with Hansa yellow | 7.34 | 15.43 | 21.66 | 35.43 |

TABLE 2

| Sample | Dispersion Stability | | | | Base Stability | Acid Stability |
|---|---|---|---|---|---|---|
| | 5 min | 10 min | 30 min | 60 min | | |
| Example 1 | + | + | + | + | + | + |
| Example 2 | + | + | + | + | + | + |
| Example 3 | + | + | + | + | + | + |
| Iriodin 205 | + | + | + | + | + | |
| Titanium mica colored with Hansa yellow | — | — | — | — | ± | — |

As can be seen from Tables 1 and 2, each of Examples 1 to 3, which belong to the yellowish scaly powder of the present invention, hardly yielded color difference between before and after treatment, such that no difference in color tone was discernible by naked eye at all in light stability test and heat stability test. Also, with respect to dispersion stability, dispersion was uniform even after being left for an hour. Further no change in color tone was discernible in any of base stability test and acid stability test.

By contrast, in titanium mica colored with Hansa yellow, which is an organic pigment, color difference was quite large in the light stability test and heat stability test, such that change in color tone was clearly seen by naked eye. Also, in the dispersion stability test, there was separation of coloring materials, and discoloration was seen. Further, discoloration was seen in the base stability test and acid stability test as well.

Also, though commercially-available titanium mica having a yellow interference color (Iriodin 205, manufactured by German Merck Corporation) exhibited a stability which was about the same as that of the yellowish scaly powder of the present invention in each kind of stability, the appearance color thereof is white and does not have a vivid yellowish appearance color such as that of the present invention.

In view of the foregoing, it is understood that the yellowish scaly powder of the present invention is excellent in various kinds of stability as compared with the conventional yellowish pigments, while exhibiting a favorable yellowish color tone.

Experiment 2: Influence of Ratio of Metal Species

Similarly to Example 1, while the concentration of the aqueous nickel chloride solution was changed, scaly powders coated with respective composite metal oxides having different ratios of titanium and nickels therein were manufactured. The appearance color of thus obtained powders were measured by naked eye as well as by Minolta CM-1000 analyzer. Also, glossiness was measured in the following manner. Namely, 1 g of each powder was weighed and introduced into 15 ml of nitrocellulose lacquer as a sample. An applicator with a clearance of 0.101 mm was used to apply this sample to white paper. After being dried, the color of the sample was measured at a regular reflection direction in which incident angle/light receiving angle was 45 degrees/45 degrees by a variable angle spectrocolorimeter (GCMS-3, manufactured by Murakami Shikisai Kenkyusho). The Y value obtained thereby was defined as glossiness. The results are shown in Table 3.

TABLE 3

| Weight Ratio (Ti/Ni) | Appearance (observed with naked eye) | Color tone H | Color tone V/C | Glossiness (Y value) |
|---|---|---|---|---|
| 30/70 | Dim yellow | 1.8GY | 7.9/4.4 | 609.93 |
| 45/55 | Yellow and weak gloss | 0.5GY | 8.3/3.9 | 649.47 |
| 55/45 | Vivid yellow and gloss | 1.5GY | 8.6/4.9 | 743.32 |
| 70/30 | Vivid yellow and gloss | 0.8GY | 8.5/4.1 | 878.84 |
| 85/15 | Vivid yellow and weak gloss | 0.6GY | 8.7/4.5 | 912.07 |
| 90/10 | Pale yellow and high gloss | 7.9Y | 8.5/2.0 | 1220.77 |
| 95/5 | Nearly white and high gloss | 9.3Y | 8.2/2.5 | 1151.47 |

As can be seen from Table 3, in the case where the metal species constituting the composite metal oxide coating the base scaly powder are titanium and nickel alone, when the ratio of titanium is less than 45% by weight, chroma is so low that the appearance color becomes dim yellow; whereas, when the ratio of titanium exceeds 90% by weight, coloring of yellow is hardly discernible, thereby forming whitish powder.

In view of the foregoing, it is understood that ratios of titanium and nickel are such that, with respect to a total metal amount in the composite metal oxide, titanium is 45 to 90% by weight an nickel is 10 to 55% by weight or preferably titanium is 55 to 85% by weight and nickel is 15 to 45% by weight.

Also, it is suggested that glossiness changes depending on the ratios of titanium and nickel, whereby powders having various glossiness values from weak gloss to high gloss can be obtained.

Here, when yellowish scaly powders coated with respective composite metal oxides having various ratios of titanium, nickel, and tin therein were prepared, and their appearance were observed with naked eye together with investigation of their color tone, it was found that chroma remarkably decreased when the ratio of titanium was less than 45% by weight, whereas coloring of yellow was hardly discernible when the ratio was in excess of 90% by weight. Also, when the ratio of tin, which was the third metal component, was 1% by weight or more, it was seen even by naked eye that the appearance color was tinged with green, while a higher chroma was obtained. When it was excess of 25% by weight, however, color tone and glossiness were rather deteriorated.

In view of foregiongs, in the case where the metal species constituting the composite metal oxide coating the base scaly powder comprises a third metal component in addition to titanium and nickel, it is suggested that ratios of titanium, nickel, and the third metal component are such that, with respect to a total metal amount in said composite metal oxide, titanium is 45 to 90% by weight, nickel is 9 to 30% by weight, and the third metal component is 1 to 25% by weight or preferably titanium is 50 to 80% by weight, nickel is 12 to 26% by weight, and the third metal component is 8 to 24% by weight.

Examples 4 to 14

To 200 g of ion-exchanged water, 20 g of each of commercially-available titanium mica pigments having various interference colors was added and uniformly dispersed therein with stirring. To thus obtained dispersion, 70 ml of 10% aqueous nickel (II) chloride solution was added for 3 hours at 80° C. while pH was maintained at 4 to 5 with 1N aqueous caustic soda solution. After the resulting mixture was subjected to filtering, the residue was washed with water and then dried at 105° C., whereby 25 g of titanium mica coated with hydrous nickel oxide was obtained.

Then, 10 g of thus obtained titanium mica coated with hydrous nickel oxide and 5 g of each of carbonates of zinc, rubidium, barium, scandium, sodium, bismuth, magnesium, aluminum, cerium, neodymium, and strontium were mixed by a small blender and the resulting mixtures was calcined for 3 hours at 800° C. in atmosphere, whereby yellowish scaly powders having various color tones were obtained.

Appearance colors observed with naked eye, color tones measured by Minolta CM-1000 analyzer, and results of stability tests of the yellowish scaly powders obtained as mentioned above were shown in Tables 4 to 6.

TABLE 4

| | Base | | | Color tone | |
|---|---|---|---|---|---|
| Sample | * | Metal Species | Appearance | H | V/C |
| Example 4 | A | Ti—Ni—Zn | Green-tinged yellow and gloss | 9.2Y | 8.5/4.1 |
| Example 5 | B | Ti—Ni—Rb | Yellow and gloss | 9.4Y | 8.8/4.3 |
| Example 6 | B | Ti—Ni—Ba | Yellow and gloss | 10Y | 8.6/4.9 |
| Example 7 | B | Ti—Ni—Ce | Yellow and gloss | 8.5Y | 8.4/5.1 |
| Example 8 | C | Ti—Ni—Na | Red-tinged yellow and gloss | 6.6Y | 7.7/5.1 |
| Example 9 | C | Ti—Ni—Bi—Al | Red-tinged yellow and gloss | 6.6Y | 8.7/4.6 |
| Example 10 | B | Ti—Ni—Mg—Zn | Yellow and weak gloss | 9.4Y | 8.9/4.3 |
| Example 11 | A | Ti—Ni—Al | Green-tinged yellow and gloss | 4.2GY | 8.8/4.1 |
| Example 12 | B | Ti—Ni—Ce—Mg | Yellow and gloss | 9.6Y | 8.7/4.9 |
| Example 13 | B | Ti—Ni—Nd | Yellow and weak gloss | 7.6Y | 7.9/4.2 |
| Example 14 | C | Ti—Ni—Sr | Red-tinged yellow and gloss | 7.9Y | 8.7/4.4 |
| Iriodin 235 | — | Ti | Green-tinged white and gloss | 5.6G | 5.5/3.0 |
| Iriodin 205 | — | Ti | Yellow-tinged white and gloss | 5.4Y | 5.8/3.1 |
| Iriodin 217 | — | Ti | Red-tinged white and gloss | 2.2R | 4.6/3.6 |

*A is Iriodin 235, which is titanium mica having a green interference color.
B is Iriodin 205, which is titanium mica having a yellow interference color.
C is Iriodin 217, which is titanium mica having a red interference color.

TABLE 5

| | | Heat Stability | | |
|---|---|---|---|---|
| Sample | Light Stability | 200° C. | 300° C. | 400° C. |
| Example 4 | 0.11 | 0.10 | 0.11 | 0.11 |
| Example 5 | 0.11 | 0.12 | 0.18 | 0.13 |
| Example 6 | 0.24 | 0.13 | 0.15 | 0.18 |
| Example 7 | 0.15 | 0.12 | 0.12 | 0.12 |
| Example 8 | 0.10 | 0.17 | 0.15 | 0.16 |
| Example 9 | 0.10 | 0.11 | 0.13 | 0.11 |
| Example 10 | 0.11 | 0.13 | 0.15 | 0.15 |
| Example 11 | 0.17 | 0.11 | 0.11 | 0.12 |
| Example 12 | 0.20 | 0.12 | 0.14 | 0.15 |
| Example 13 | 0.10 | 0.11 | 0.13 | 0.17 |
| Example 14 | 0.15 | 0.15 | 0.13 | 0.17 |
| Iriodin 205 | 0.15 | 0.15 | 0.16 | 0.17 |

TABLE 6

| | Dispersion Stability | | | | Base | Acid |
|---|---|---|---|---|---|---|
| Sample | 5 min | 10 min | 30 min | 60 min | Stability | Stability |
| Example 4 | + | + | + | + | + | + |
| Example 5 | + | + | + | + | + | + |
| Example 6 | + | + | + | + | + | + |
| Example 7 | + | + | + | + | + | + |
| Example 8 | + | + | + | + | + | + |
| Example 9 | + | + | + | + | + | + |
| Example 10 | + | + | + | + | + | + |
| Example 11 | + | + | + | + | + | + |
| Example 12 | + | + | + | + | + | + |
| Example 13 | + | + | + | + | + | + |
| Example 14 | + | + | + | + | + | + |
| Iriodin 205 | + | + | + | + | + | + |

As can be seen from Tables 4 to 6, commercially-available titanium mica which is used as a base material has an interference color of yellow, red, or green, and various kinds of stability thereof are favorable. It basically has a white appearance color and does not have a vivid yellowish appearance color, however.

By contrast, each of the powders of Examples 4 to 14, in which titanium of this titanium mica, nickel, and the third metal component were combined together to form a composite metal oxide coating the powder, exhibited a vivid yellowish appearance color in which both value of color and chroma were high. These powders also had an interference color of titanium mica used as a material and, in some cases, exhibited dichroism. Also, products with various glossiness values were obtained depending on the metal components combined therewith.

Examples 15

By a small blender, 10 g of Iriodin 231, which is titanium mica having a green interference color manufactured by German Merck Corporation, 3.4 g of nickel carbonate, and 1.4 g of lead carbonate were uniformly mixed together. The resulting mixture was introduced into a magnetic crucible and calcined for 2 hours at 900° C. in atmosphere in a electric furnace, whereby 10.08 g of a weakly glossy powder having a vivid green-tinged yellow appearance color and green interference color was obtained.

Examples 16

By a small blender, 10 g of titanium mica obtained in Example 1, 2.003 g of nickel carbonate, and 1.10 g of potassium carbonate were uniformly mixed together. The resulting mixture was introduced into a magnetic crucible and calcined for 2 hours at 800° C. in atmosphere in a electric furnace, whereby 10.21 g of a glossy powder having an appearance color and interference color of yellow was obtained.

Example 17

10 g of stainless foil having a particle size distribution of 10 to 70 μm was introduced Into a quartz board and this board was placed at the center portion of a core tube of a cylindrical electric furnace. Then, a flask containing 50.0 g of titanium isopropoxide was connected to one end of the core tube. Then, while the whole reaction system including the flask and core tube portion was kept at 150° C. and 1 torr, heat treatment was effected till titanium isopropoxide within the flask completely disappeared. After being left for cooling, the reaction product was further calcined at 600° C. for 2 hours, whereby 15.3 g of stainless foil coated with titanium dioxide was obtained. By a small blender, 10.0 g of thus obtained stainless foil coated with titanium dioxide, 5 g of nickel carbonate, and 5 g of aluminum hydroxide were uniformly mixed together. The resulting mixture was calcined for 4 hours at 900° C. in a magnetic crucible. After being left for cooling, the resulting powder was classified by levigation, whereby 12.1 g of a glossy powder having a pale yellow appearance color was obtained.

Example 18

50 g of kaolinite was added to 500 g of ion-exchanged water and the mixture was sufficiently stirred so as to be uniformly dispersed therein. To thus obtained dispersion, 300 ml of 2M aqueous titanyl sulfate solution was added. While being stirred, the mixture was heated and boiled for 3 hours. After being left for cooling, the reactant was subjected to filtering. The residue was washed with water and then dried at 200° C., whereby 95 g of kaolinite coated with titanium dioxide was obtained.

To 200 g of ion-exchanged water, 50 g of thus obtained kaolinite coated with titanium dioxide was added and stirred so as to be uniformly dispersed therein. To the resulting dispersion, 100 ml of aqueous nickel (II) chloride solution having a concentration of 10% was added for 3 hours at 80° C. while pH was kept at 4 to 5 with a 1N aqueous caustic soda solution. The reactant was subjected to filtering. After being washed with water, the residue was dried at 105° C., whereby 55 g of kaolinite coated with hydrous nickel oxide and titanium dioxide was obtained.

Then, thus obtained kaolinite coated with hydrous nickel oxide and titanium dioxide was calcined for 4 hours at 880° C. in a magnetic crucible, whereby 115 g of powder having a yellow or gold appearance color was obtained.

Appearance colors observed with naked eye and color tones measured by Minolta CM-1000 analyzer of the yellowish scaly powders obtained by above-mentioned Example 15 to 18 were shown in Table 7. Also, in each stability test, those had excellent stability same as Examples 1 to 14.

TABLE 7

| Sample | Metal Species | Appearance | Color tone H | V/C |
| --- | --- | --- | --- | --- |
| Example 15 | Ti—Ni—K | Yellow and gloss | 0.1GY | 8.9/5.7 |
| Example 16 | Ti—Ni—Pb | Yellow and weak gloss | 7.6Y | 8.6/5.2 |
| Example 17 | Ti—Ni—Al | Pale Yellow and gloss | 1.2Y | 8.9/3.3 |
| Example 18 | Ti—Ni | Yellow or gold and gloss | 4.0Y | 3.3/3.8 |

When the powders obtained by Examples 15 to 18 were analyzed by X-ray diffraction method as in the case of Example 1, a diffraction peak of a composite metal oxide was seen in each of the X-ray diffraction charts. Also, when the composition ratio of the powder was calculated in the case of Example 1 or 2, the powder of Example 18, for example, was 52.1% by weight of kaolinite, 27.9% by weight of titanium dioxide, 20.0% by weight of titanium nickel oxide and the ratios of titanium and nickel with respect to the total metal mount in the composite metal oxide were 44.9% by weight and 55.1% by weight, respectively.

As explained in the foregoing, since a scaly powder is coated with a composite metal oxide of titanium and nickel or a composite metal oxide of titanium, nickel, and a third metal component, the yellowish scaly powder in accordance with the present invention characteristically exhibits a yellowish color tone with high value of color and chroma as well as a broad color width, while being excellent in various kinds of pigment stability. Also, color tone and glossiness can be easily adjusted.

What is claimed is:

1. A yellowish scaly powder comprising a base scaly powder, said base scaly powder being coated with a composite metal oxide comprising titanium and nickel.

2. A yellowish scaly powder according to claim 1, wherein said composite metal oxide contains, based upon a total metal amount in said composite metal oxide, 45 to 90% by weight of titanium and 10 to 55% by weight of nickel.

3. A yellowish scaly powder according to claim 1, said composite metal oxide further comprising a third metal component.

4. A yellowish scaly powder according to claim 3, wherein said third metal component is at least one metal component selected from the group consisting of Zn, Rb, K, Ba, Sc, Sn, Na, Bi, Pb, Mg, Al, Ce, Nd, and Sr.

5. A yellowish scaly powder according to claim 3, wherein said composite metal oxide contains, based upon a total metal amount in said composite metal oxide, 45 to 90% by weight of titanium, 9 to 30% by weight of nickel, and 1 to 25% by weight of said third metal component.

6. A yellowish scaly powder according to claim 3, wherein said composite metal oxide contains a diffraction peak which is different from any peaks of individual oxides of the metal used in making said composite metal oxide as shown on an X-ray diffraction chart.

7. A yellowish scaly powder according to claim 1, wherein said composite metal oxide contains a diffraction peak which is different from any peaks of individual oxides of the metal used in making said composite metal oxide as shown on an X-ray diffraction chart.

8. A yellowish scaly powder according to claim 7, wherein said diffraction peak is $NiTiO_3$.

9. A yellowish scaly powder according to claim 1, wherein said base scaly powder having an interference color.

10. A yellowish scaly powder according to claim 9, wherein said base scaly powder is coated with said composite metal oxide comprising titanium and nickel, said yellowish scaly powder exhibits a color which is identical to said interference color of said base scaly powder.

11. A yellowish scaly powder according to claim 9, wherein said base scaly powder is coated with said composite metal oxide comprising titanium, nickel, and a third metal component, said yellowish scaly powder exhibits a color which is identical to said interference color of said base scaly powder.

12. A yellowish scaly powder according to claim 1, wherein said yellowish scaly powder is manufactured by calcining mica coated with titanium dioxide and a nickel compound at 500°–1000° C., said mica coated with titanium dioxide having an interference color, and said yellowish scaly powder exhibiting an interference color identical to said interference color of said mica coated with titanium dioxide.

13. A yellowish scaly powder according to claim 1, wherein said yellowish scaly powder is manufactured by calcining mica coated with titanium oxide and nickel and a third metal compound at 500°–1000° C., said mica coated with titanium dioxide having an interference color, and said yellowish scaly powder exhibiting an interference color identical to said interference color of said mica coated with titanium dioxide.

14. A yellowish scaly powder according to claim 13, wherein said nickel compound is at least one selected from a group consisting of an oxide, an inorganic salt, and an organic salt of nickel.

15. A yellowish scaly powder according to claim 14, wherein said third metal compound is at least one selected from a group consisting of an oxide, an inorganic salt, and an organic salt of said third metal.

16. A yellowish scaly powder according to claim 1, wherein said yellowish scaly powder is within a range of 6.5 Y to 5 OGY in hue in Munsell color system.

17. A yellowish scaly powder according to claim 1, wherein said base scaly powder comprises muscovite, biotite, phlogopite, synthetic mica, kaolin, talc, planar silica, planar alumina, aluminum foil, stainless foil, or titanium dioxide coated mica.

* * * * *